US011530954B2

(12) United States Patent
Lam

(10) Patent No.: US 11,530,954 B2
(45) Date of Patent: Dec. 20, 2022

(54) ON-CHIP TEMPERATURE SENSOR CIRCUITS

(71) Applicant: Skyworks Solutions, Inc., Irvine, CA (US)

(72) Inventor: Lui Lam, Lexington, MA (US)

(73) Assignee: Skyworks Solutions, Inc., Irvine, CA (US)

( * ) Notice: Subject to any disclaimer, the term of this patent is extended or adjusted under 35 U.S.C. 154(b) by 614 days.

(21) Appl. No.: 16/528,230

(22) Filed: Jul. 31, 2019

(65) Prior Publication Data

US 2020/0041357 A1 Feb. 6, 2020

Related U.S. Application Data

(60) Provisional application No. 62/713,363, filed on Aug. 1, 2018.

(51) Int. Cl.
*G01K 7/01* (2006.01)
*G01K 15/00* (2006.01)

(52) U.S. Cl.
CPC ............. *G01K 7/01* (2013.01); *G01K 15/005* (2013.01)

(58) Field of Classification Search
USPC ........................................ 374/178, 170, 163
See application file for complete search history.

(56) References Cited

U.S. PATENT DOCUMENTS

| 5,604,427 | A | 2/1997 | Kimura | |
|---|---|---|---|---|
| 7,009,444 | B1 * | 3/2006 | Scott | G05F 3/30 327/535 |
| 2008/0259989 | A1 * | 10/2008 | Doorenbos | G01K 7/01 374/170 |

OTHER PUBLICATIONS

Golda, A., et al., Analysis and Design of PTAT Temperature Sensor in Digital CMOS VLSI Circuits, AGH University of Science and Technology, Department of Microelectronics & Computer Science, Technical University of Lodz, Poland, MIXDES 2006, International Conference, Mixed Design, Jun. 22-24, 2006, in 6 pages.
Jung, Ying-Zong, et al., A High-linearity CMOS Temperature Sensor Using a PTAT-voltage Driving Common-source Amplifier with a Source Resistor, Eurosensors 2015, Procedia Engineering 120, in 4 pages.
Malits, Maria, et al., Study of CMOS-SOI Integrated Temperature Sensing Circuits for On-Chip Temperature Monitoring, www.mdpi.com/journal/sensors, Sensors 2018, 18, 1629, Department of Electrical Engineering, Technion—Israel Institute of Technology, Published May 19, 2018, in 14 pages.

* cited by examiner

*Primary Examiner* — Mirellys Jagan
(74) *Attorney, Agent, or Firm* — Knobbe, Martens, Olson & Bear, LLP

(57) ABSTRACT

A diode voltage from a diode circuit can be combined with a proportional to absolute temperature (PTAT) voltage generated by a PTAT circuit to determine a temperature sensor voltage. This temperature sensor voltage may correspond to a temperature of a circuit or a localized temperature. By determining the temperature sensor voltage using a combination of a PTAT voltage and diode voltage, it is possible to remove or a PTAT circuit used to generate a bandgap voltage, which may shrink the temperature sensor and increase the accuracy of the temperature sensor circuit.

20 Claims, 13 Drawing Sheets

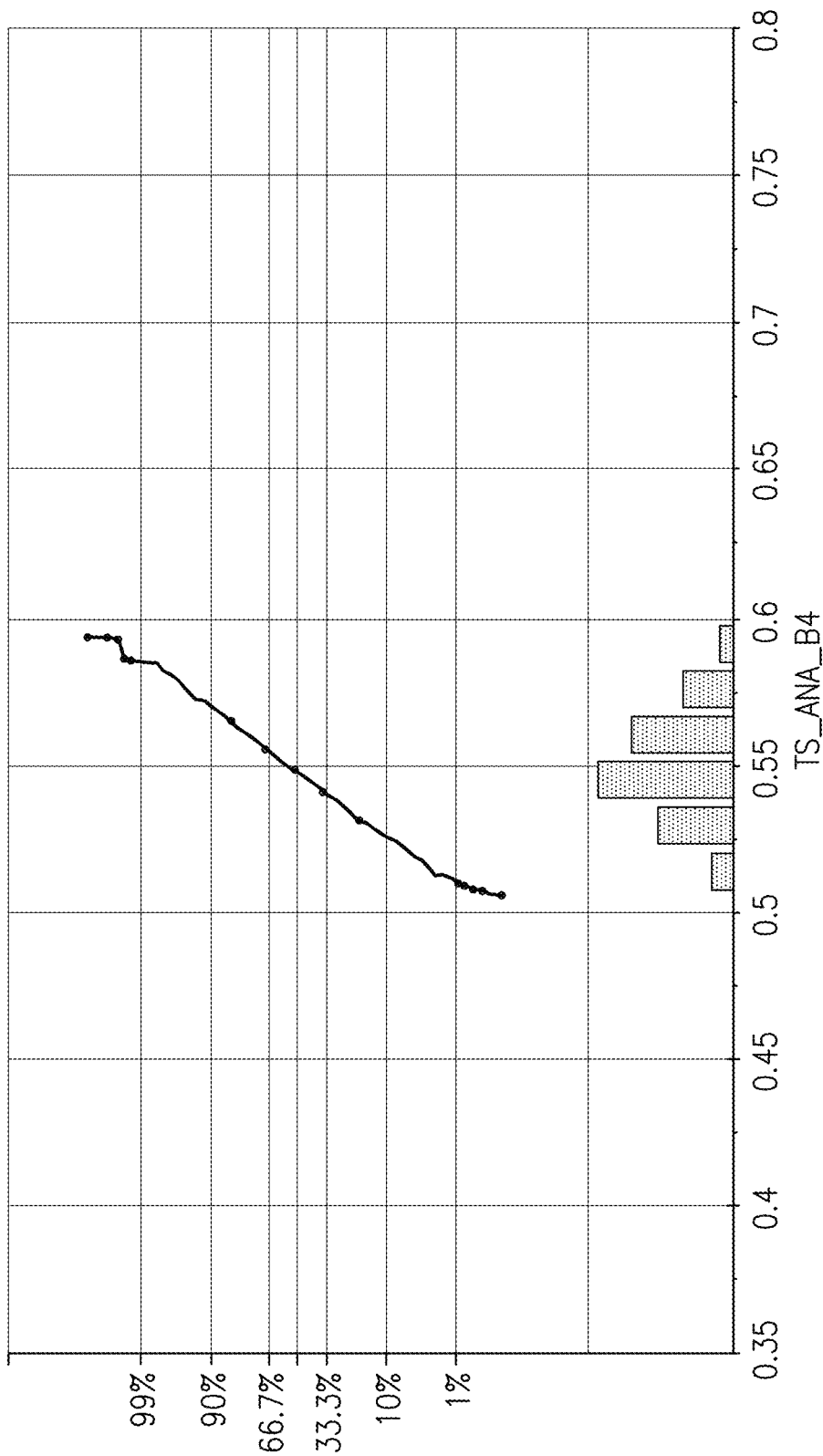

ON-CHIP TEMPERATURE SENSOR CIRCUITS

INCORPORATION BY REFERENCE TO ANY PRIORITY APPLICATIONS

This application claims priority to U.S. Provisional Application No. 62/713,363, which was filed on Aug. 1, 2018 and is titled "ON-CHIP TEMPERATURE SENSOR CIRCUITS," the disclosure of which is expressly incorporated by reference herein in its entirety for all purposes. Any and all applications, if any, for which a foreign or domestic priority claim is identified in the Application Data Sheet of the present application are hereby incorporated by reference in their entireties under 37 CFR 1.57.

BACKGROUND

Technical Field

This disclosure relates to temperature sensors. More specifically, this disclosure relates to temperature sensors that may be implemented on-chip in, for example, a front-end module.

Description of Related Technology

Temperature sensors may be used to measure a temperature of chip or semiconductor device. Measurement of the temperature of a semiconductor device can be useful for determining whether a device is functioning accurately or within tolerances of components used to create the device. Usually the temperature sensor can provide a measurement of temperature with a particular degree of accuracy within a particular temperature range. However, certain existing temperature sensors are not sufficiently accurate for some applications, such as wireless applications. Further, certain existing temperature sensors are not sufficiently accurate within a desired temperature range for some applications. Accordingly, it is desirable to create a more accurate temperature sensor.

SUMMARY

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

Certain aspects of the present disclosure relate to a temperature sensor. The temperature sensor may include a voltage generator circuit including a diode circuit and a proportional to absolute temperature circuit. The diode circuit may be configured to generate a diode voltage and the proportional to absolute temperature circuit may be configured to generate a proportional to absolute temperature voltage. The temperature sensor may further include a first scalar circuit configured to weight the diode voltage to obtain a weighted diode voltage and a second scalar circuit configured to weight the proportional to absolute temperature voltage to obtain a weighted proportional to absolute temperature voltage. In addition, the temperature sensor may include a combiner configured to combine the weighted diode voltage and the weighted proportional to absolute temperature voltage to obtain a temperature sensor voltage.

In some aspects, the combiner is an adder circuit. Further, the combiner may be implemented using an operational amplifier. In addition, the voltage generator circuit may further include a second combiner configured to combine the diode voltage and the proportional to absolute temperature voltage to obtain a bandgap voltage. In some implementations, the temperature sensor may further include a third scalar circuit configured to weight the bandgap voltage.

The proportional to absolute temperature circuit may be an active matching circuit. Further, the proportional to absolute temperature circuit may include a current mirror circuit. In some cases, the proportional to absolute temperature circuit includes a differential pair circuit.

Some aspects of the present disclosure relate to a temperature sensor die. The temperature sensor die may include a temperature sensor including a plurality of circuit elements. Further, the temperature sensor die may include a plurality of heaters distributed among the plurality of circuit elements and configured to modify a temperature of the temperature sensor when provided with a current.

In some aspects, the plurality of circuit elements include a plurality of diodes. Further, the plurality of heaters may include a plurality of resistors. In some cases, at least one resistor from the plurality of resistors receives a different current than at least one other resistor from the plurality of resistors. Further, in some cases, at least one resistor receives the current and at least one resistor does not receive the current.

In some implementations, the current is received from a controller of a test board configured to test the temperature sensor die. Further, the temperature sensor may be configured to provide an output voltage to the controller. In some designs, the plurality of circuit elements are distributed in a set of columns on the temperature sensor die. In some cases, the plurality of heaters are distributed between the set of columns. Further, in some implementations, the plurality of heaters forms a second set of columns, the second set of columns interleaved with the set of columns.

Certain aspects of the present disclosure relate to a method of testing a temperature sensor. The method may include determining a first temperature of a temperature sensor under test; determining a first output of the temperature sensor under test; causing a heater integrated with the temperature sensor to heat at least one circuit element of the temperature sensor causing a change in temperature of at least a portion of the temperature sensor under test; determining a second temperature of the temperature sensor under test; determining a second output of the temperature sensor under test; and determining whether a difference between the second output and the first output corresponds to a change between the second temperature and the first temperature.

At least some of the method may be performed by a controller included on a test board that may be configured to test the temperature sensor. Further, determining the first temperature of the temperature sensor may include determining a temperature of one or more circuit elements of the temperature sensor. In some cases, the first output and the second output are voltages that correspond to a temperature measured by the temperature sensor. Further, causing the heater to heat the at least one circuit element may include providing a current to the heater. The amount of current provided to the heater may correspond to a particular desired change in temperature. The particular desired change in temperature may be determined based at least in part on a test profile supplied to a controller included on a test board configured to test the temperature sensor.

In some implementations, determining whether the difference between the second output and the first output corresponds to the change between the second temperature and the first temperature includes determining whether the difference between the second output and the first output matches an expected difference based at least in part on the change between the second temperature and the first temperature. Further, the method may include performing a corrective action on the temperature sensor when determining that the difference between the second output and the first output does not correspond to a change between the second temperature and the first temperature. Further, performing the corrective action includes trimming one or more voltages generated by the temperature sensor. In some cases, a diode voltage or a proportional to absolute temperature voltage is trimmed. The method may further include alerting a user when determining that the difference between the second output and the first output does not correspond to a change between the second temperature and the first temperature.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 10B illustrates test data for a temperature sensor implemented using the embodiments disclosed herein.

DETAILED DESCRIPTION

Temperature sensors may be used to help regulate the temperature of an electronic device. When it is determined that an electronic device, such as a wireless device, or a chip included within the electronic device is exceeding a temperature threshold, corrective actions can be taken to reduce the temperature of the device or chip. When a temperature sensor is inaccurate, both false negative and false positives may occur in determining whether the temperature threshold has been reached. The present disclosure provides an improved temperature sensor. The temperature sensor can be improved by removing circuitry that is not directly needed for sensing temperature, such as circuitry associated with generating a reference voltage. Further, by reducing the circuitry included in the temperature sensor, the footprint of the temperature sensor can be reduced.

Figure 1:
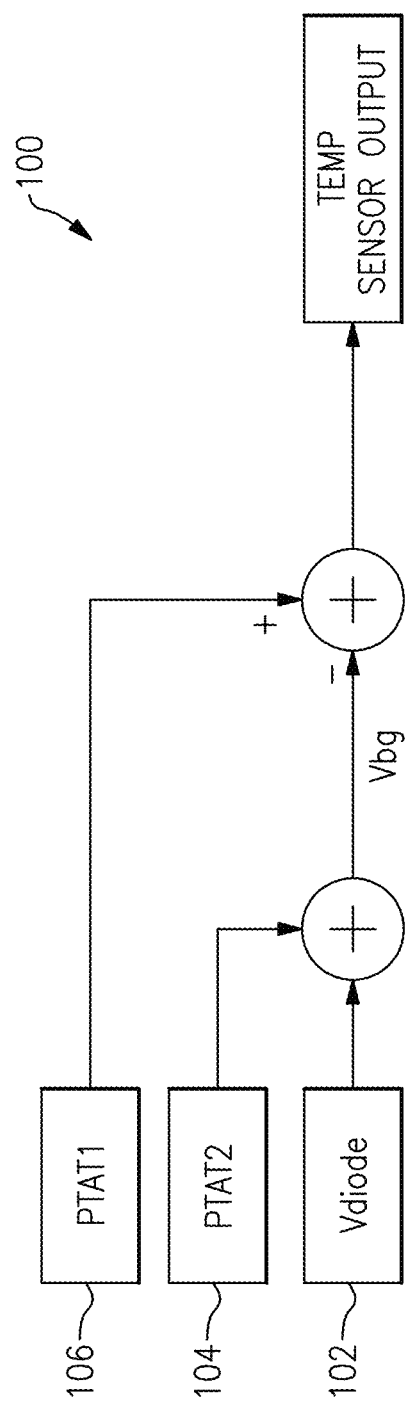
FIG. 1 illustrates a block diagram of an embodiment of a combined bandgap voltage generator and temperature sensor circuit.

FIG. 1 illustrates a block diagram of an embodiment of a combined bandgap voltage generator and temperature sensor circuit 100. The combined bandgap voltage generator and temperature sensor circuit 100 may generate a reference voltage. This reference voltage may be a temperature independent reference voltage, such as a bandgap voltage (Vbg). The bandgap voltage may be generated by combining a diode voltage, Vdiode, from a Vdiode circuit 102 with a proportional to absolute temperature (PTAT) voltage generated by a PTAT circuit 104. The generation of the bandgap voltage is illustrated in FIG. 1 as the summation of the diode voltage generated by the Vdiode circuit 102 and a voltage generated by the PTAT circuit 104 referenced as PTAT2. The generation of the bandgap voltage, Vbg, can be represented by equation 1 below with $k_1$ representing a scalar or weighting applied to the PTAT voltage generated by the PTAT2 circuit of FIG. 1 and Vdiode representing a diode voltage generated by the Vdiode circuit.

$$Vbg = k_1 \text{PTAT} + V\text{diode} \quad (1)$$

A temperature sensor output can be generated by using a PTAT signal generated by the PTAT1 circuit 106 subtracted by the scaled bandgap voltage. The generation of the temperature sensor output, Vts, can be represented by equation 2 below with $k_2$ representing a scalar or weighting applied to the PTAT voltage generated by the PTAT1 circuit 106 of FIG. 1 and $k_3$ representing a scalar or weighting applied to the Vbg voltage. Further $k_3$ may be used to align Vts with a particular desired specification (e.g., an application specific specification or design requirement), which may not be proportional to absolute temperature (PTAT). Many applications of the temperature sensor require at least some signal mapping from PTAT to a particular temperature-voltage range to improve operation of the particular circuit relying on the temperature sensor measurement.

$$Vts = k_2 \text{PTAT} - k_3 Vbg \quad (2)$$

Usually, the bandgap signal requires a particular weighting between the PTAT signal and the diode signal so that Vbg can be flat or maintained at substantially the same value over a particular temperature range. Further, the Vbg generation often requires a specific ratio of the diode voltage and PTAT signal to be flat over temperature. Configuring the circuit 100 to satisfy the requirements for generating an accurate Vbg can, in some cases, result in lower the accuracy of the temperature sensor and the output Vts.

However, as illustrated by equations 3 and 4 below, it is possible to determine Vts without use of the bandgap voltage enabling creation of a smaller and more accurate temperature sensor.

$$Vts = k_2 \text{PTAT} - k_3(k_1 \text{PTAT} + V\text{diode}) \quad (3)$$

$$Vts = k_4 \text{PTAT} - k_3 V\text{diode} \quad (4)$$

In equation 4, the scalar $k_4 = k_2 - k_3 k_1$. Accordingly, as illustrated by equation 4, it is possible to determine a positive temperature sensor voltage directly from a PTAT signal and diode voltage without the use of a bandgap voltage. Equation 4 gives a positive Vts signal associated with a positive slope. As illustrated by equations 5, 6, and 7, it is also possible to determine a negative sloped Vts signal directly from a diode voltage and PTAT voltage without the use of a Vbg signal.

$$Vts = k_5 V\text{diode} - k_6 Vbg \quad (5)$$

$$Vts = k_5 V\text{diode} - k_6(k_1 \text{PTAT} + V\text{diode}) \quad (6)$$

$$Vts = k_7 \text{PTAT} - k_8 V\text{diode} \quad (7)$$

Figure 2:
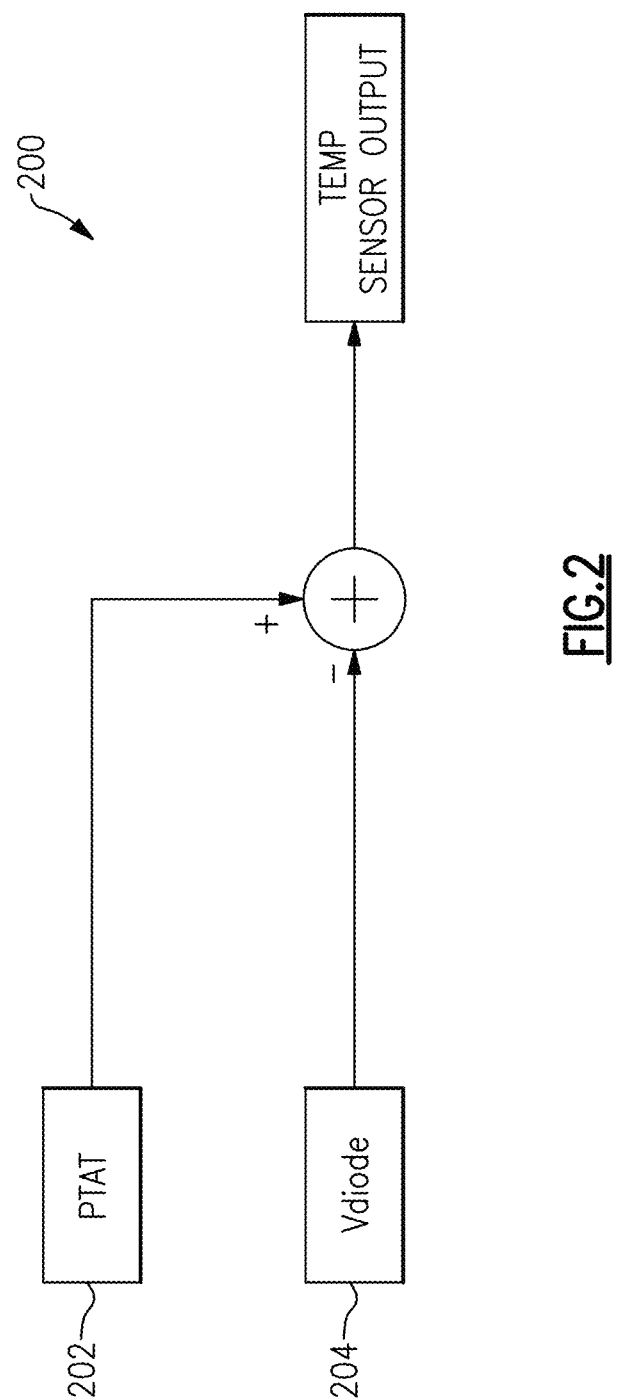
FIG. 2 illustrates a block diagram of an embodiment of a temperature sensor circuit.

In equation 7, the scalar $k_7 = k_5 - k_6 k_1$ and the scalar $k_8 = k_6 k_1$. By determining a temperature sensor signal without use of a bandgap voltage, it is possible to generate a more accurate temperature sensor that is smaller and simpler in design by, for example, reducing the number of PTAT circuits from two to one and by removing one of the adder or combiner circuits as illustrated in FIG. 2. Further, by directly generating the temperature sensor output separately from the Vbg signal, the resistor and scaling networks may be simplified or reduced.

Figure 3A:
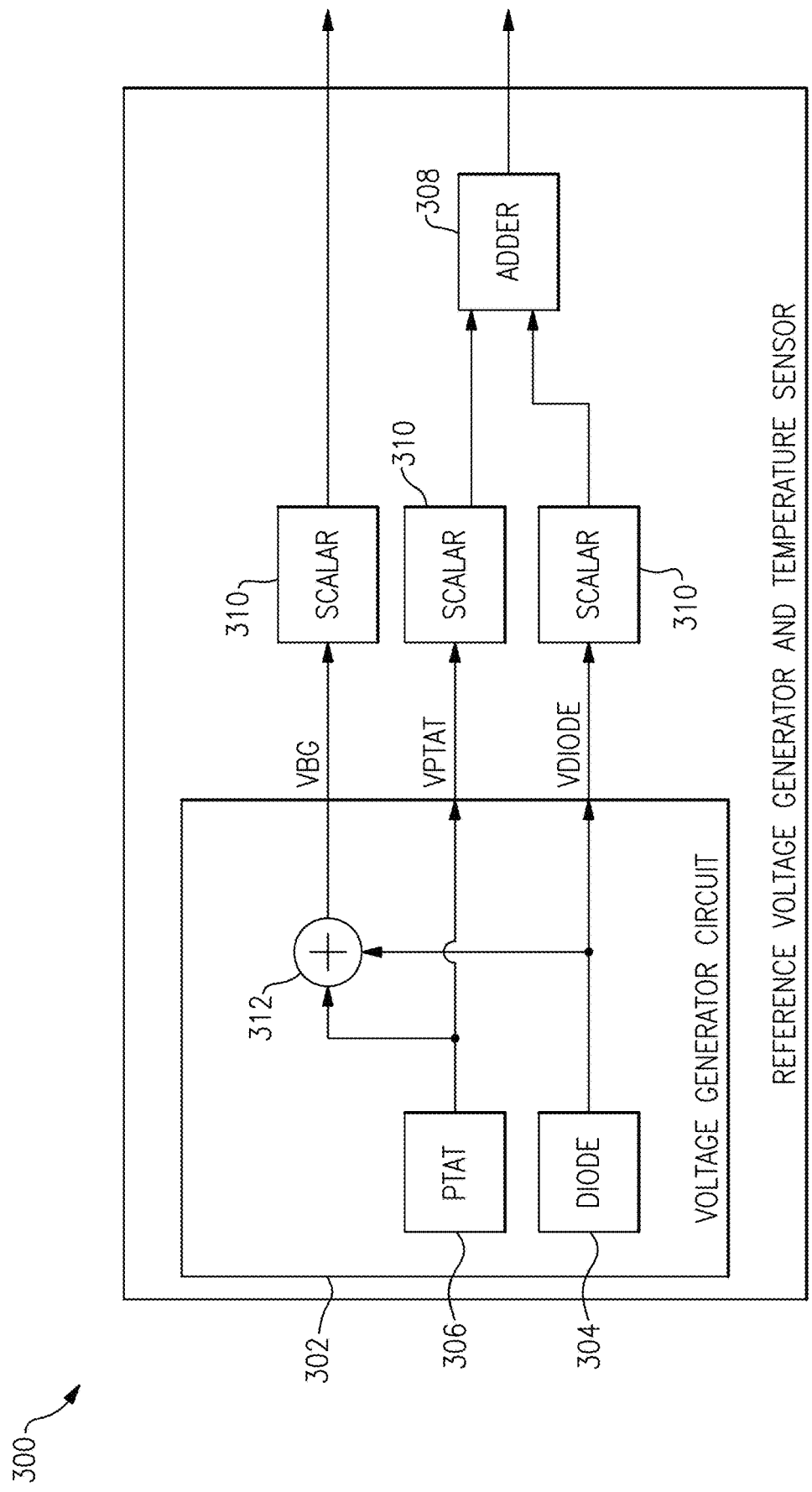
FIG. 3A illustrates a block diagram of an embodiment of a combined reference voltage generator and temperature sensor circuit.

FIG. 2 illustrates a block diagram of an embodiment of a temperature sensor circuit 200. As illustrated in FIG. 2, the temperature sensor output voltage can be generated by combining a voltage generated by a Vdiode circuit 204, and a voltage generated by a PTAT circuit 202. In some implementations, the Vdiode circuit may comprise a current source feeding or providing a current to a diode. Further, as described above, the circuitry associated with the generation of a Vbg signal may be removed from the signal path of the temperature sensor. By removing the Vbg generation circuitry from the signal path of the temperature sensor circuit 200, a more accurate temperature sensor signal can be generated and output by the temperature sensor circuit 200. In certain embodiments, as illustrated in FIG. 3A, a Vbg voltage may still be generated for, for example, trimming purposes. However, the Vbg signal in the embodiments illustrated in FIGS. 2 and 3 are independent of the signal path used to generate the temperature sensor voltage or signal. Although removed from the generation of the Vts signal, often, the bandgap signal Vbg may still be desired or generated for other purposes, such as biasing a circuit. Thus, in some cases, a Vbg circuit may be included, but omitted from the Vts circuit.

The PTAT circuit 202 may output a voltage, which may be referred to as a VPTAT. The voltage output by the PTAT circuit 202 may be a combined version of the voltage output by the separate PTAT circuits 104, 106 of FIG. 1. For example, although not limited as such, the output of the PTAT circuit 202 may be equal to the difference between the output voltage of the PTAT circuit 106 and the PTAT circuit 104 (e.g., PTAT1-PTAT2).

FIG. 3A illustrates a block diagram of an embodiment of a combined reference voltage generator and temperature sensor circuit 300. The combined reference voltage generator and temperature sensor circuit 300 may include a voltage generator circuit 302. The voltage generator circuit 302 may include a diode circuit 304 and a PTAT circuit 306. The diode circuit 304 may be or may include an embodiment of the Vdiode circuit 204. Similarly, the PTAT circuit 306 may be or may include an embodiment of the PTAT circuit 206. The diode circuit 304 may include one or more diodes that generate or output a voltage associated with the diode circuit 304. The voltage may be generated based on an input or battery supply voltage supply to the diode circuit 304. The PTAT circuit 306 may include any type of circuit for generating a proportional to absolute temperature voltage. For example, the PTAT circuit 306 may be implemented as any one of the circuits illustrated in FIG. 5A or 5B.

The circuit 302 may output a voltage generated by the diode circuit 304 as a diode voltage, Vdiode. Further, the circuit 302 may output a voltage generated by the PTAT circuit 306 as a PTAT voltage, VPTAT. In addition, the voltage generator circuit 302 may generate a reference voltage, such as a bandgap voltage (Vbg), by adding or otherwise combining the Vdiode and the VPTAT voltages using the combiner 312.

Each of the voltages generated or outputted by the voltage generator circuit 302 may be scaled or otherwise weighted by one or more scalar circuits 310 of the reference voltage generator and temperature sensor circuit 300. Each of the scalar circuits 310 may weight the received signals differently. For example, the scaling applied to the Vbg voltage may be different than the scaling applied to the VPTAT signal. The circuit 300 may output the scaled or weighted Vbg voltage, which may be used as a reference voltage or for trimming a voltage used or otherwise generated by one or more components of an electronic device, such as a wireless device. For example, the Vbg voltage may be used by a front end module or a power amplifier module of a wireless device.

The scaled or weighted VPTAT voltage and the scaled or weighted Vdiode voltage may be combined by an adder 308, or other combining circuit, to generate a temperature sensor voltage, Vts. The temperature sensor voltage may be either a positive or negative voltage.

Figure 3B:
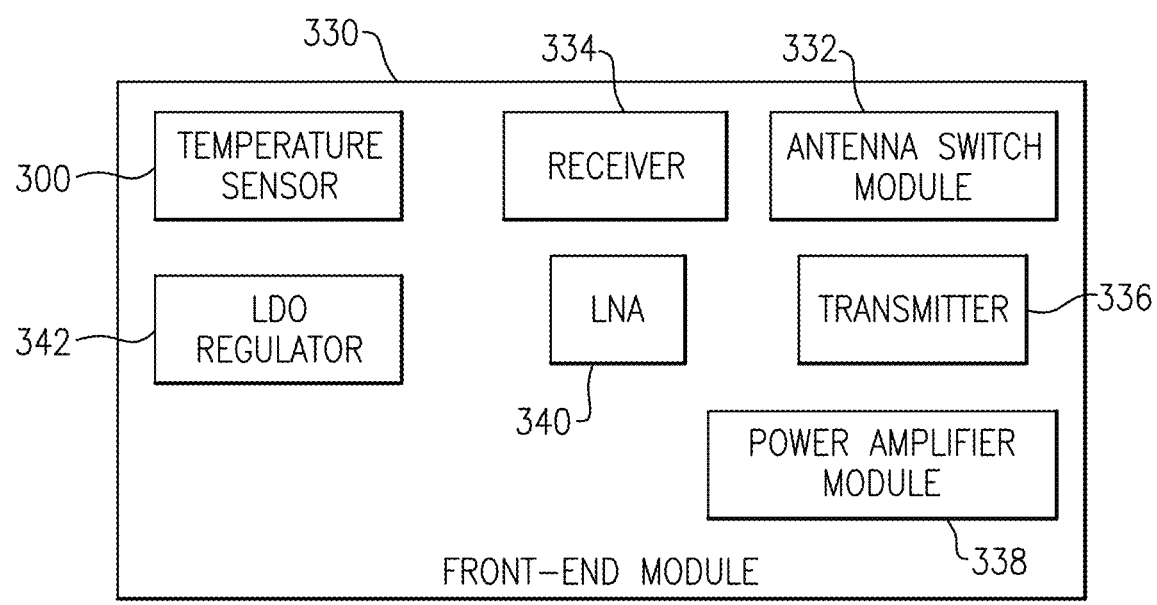
FIG. 3B illustrates a block diagram of an embodiment of a front-end module (FEM) that includes a temperature sensor circuit.

FIG. 3B illustrates a block diagram of an embodiment of a front-end module (FEM) 320 that includes a temperature sensor circuit. As illustrated, the temperature sensor circuit may be a combined reference voltage generator and temperature sensor circuit 300 as illustrated in FIG. 3A. Alternatively, the temperature sensor circuit may omit additional functionality, such as the reference voltage or bandgap voltage generator functionality, and include only functionality relating to temperature sensing.

In some implementations, the front-end module 330 may include various elements for supporting communication in a wireless device. For example, the front-end module 330 may include an antenna switch module 332, a receiver 334, a transmitter 336, a power amplifier module 338, and/or a low noise amplifier (LNA) 340. The antenna switch module 332 may include any circuitry that can switch the front-end module from receiving or transmitting signals from an antenna. Further, the antenna switch module 332 may control which antenna is set to transmit a signal from the front-end module 330.

The receiver 334 may include any circuitry for receiving a signal from an antenna. For example, the receiver 334 may include one or more filters and/or multiplexers for selecting signals received at a particular frequency band. The received signals may be provided to a low noise amplifier 340 to amplify the received signal before it is provided for further processing. In some cases, filtering may occur before, after, or both before and after the signal is provided to the LNA 340.

The transmitter 336 may include any circuitry for transmitting a signal over an antenna. The signal may be amplified by one or more power amplifiers of a power amplifier module 338 before it is transmitted to increase the transmission range of the signal.

Further, the FEM 330 may include a voltage regulator for regulating a supply voltage. For example, the FEM 330 may include a low-dropout (LDO) regulator.

The FEM 330 may be included in a wireless device. As the wireless device is operated, the temperature of the components of the wireless device may change. The temperature sensor 300 of the front-end module 330 may measure the temperature of the front-end module 330. A controller may modify operation of the front-end module 330 based on the temperature of the front-end module 330 measured by the temperature sensor 300. For example, the controller may implement over-temperature protection by, for example, adjusting transmission signal strength or reducing a supplied voltage.

Figure 4:
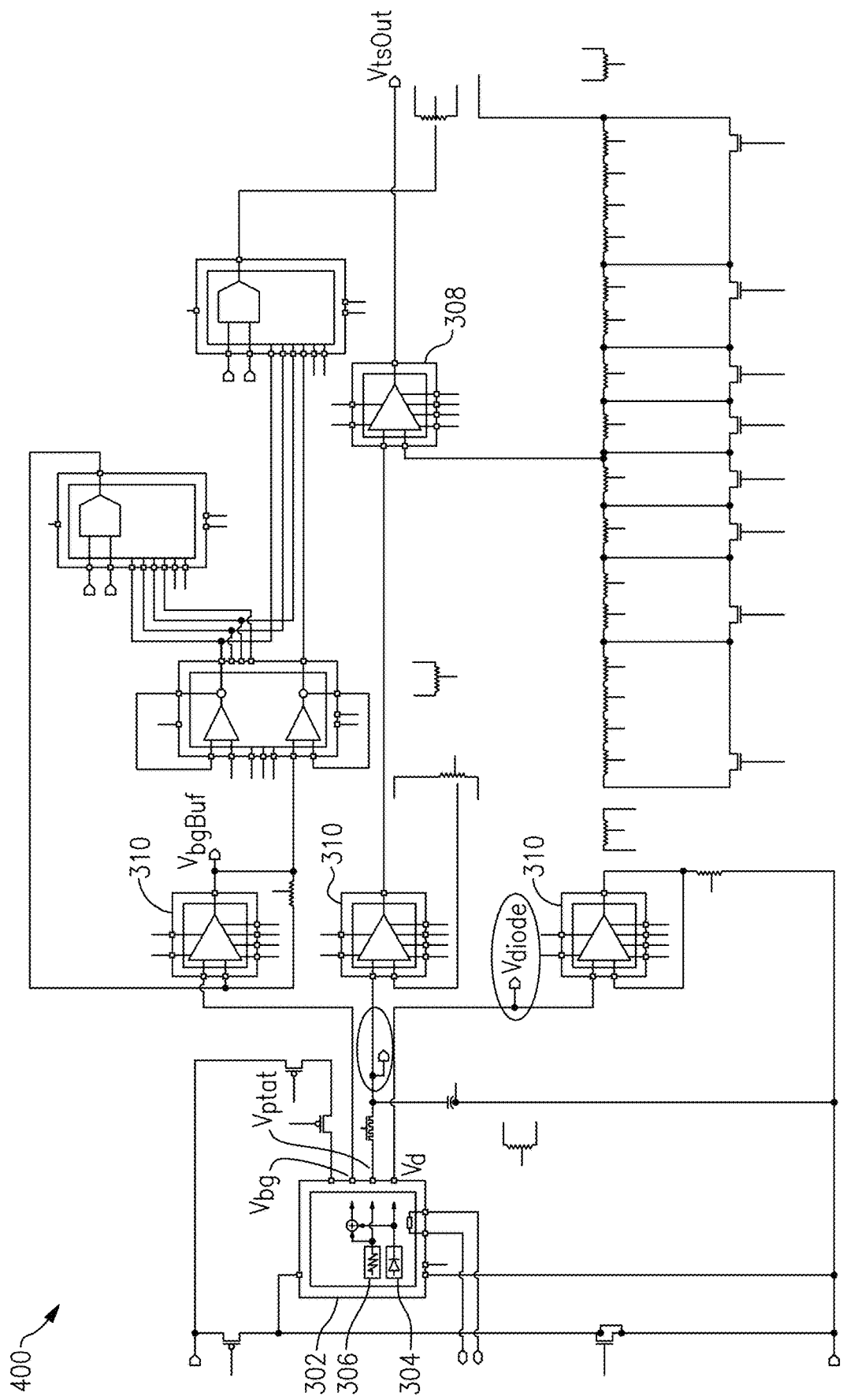
FIG. 4 illustrates an embodiment of a combined reference voltage generator and temperature sensor circuit.

FIG. 4 illustrates an embodiment of a combined reference voltage generator and temperature sensor circuit 400. As illustrated in FIG. 4, the scalar circuits 310 can be implemented using an amplifier, such as a power amplifier or operational amplifier. Similarly, the adder or combiner 308 may be implemented using one or more amplifiers. Alternatively, or in addition, the adder or combiner 308 may include one or more logic gates to facilitate combining the scaled Vdiode and VPTAT signals.

Figure 5A:
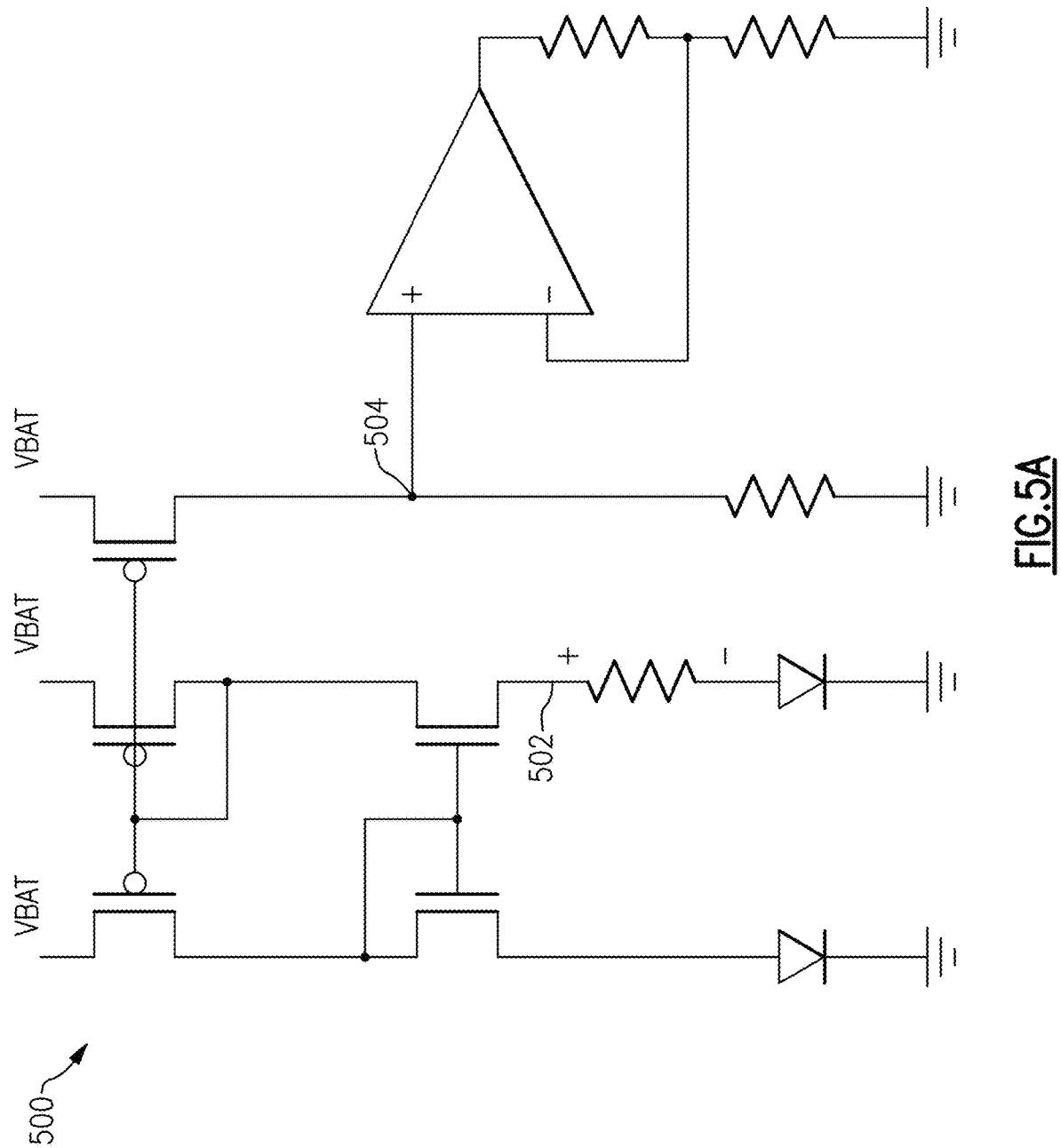
FIGS. 5A and 5B illustrate two different example embodiments of a proportional to absolute temperature (PTAT) circuit using active matching.
Figure 5B:
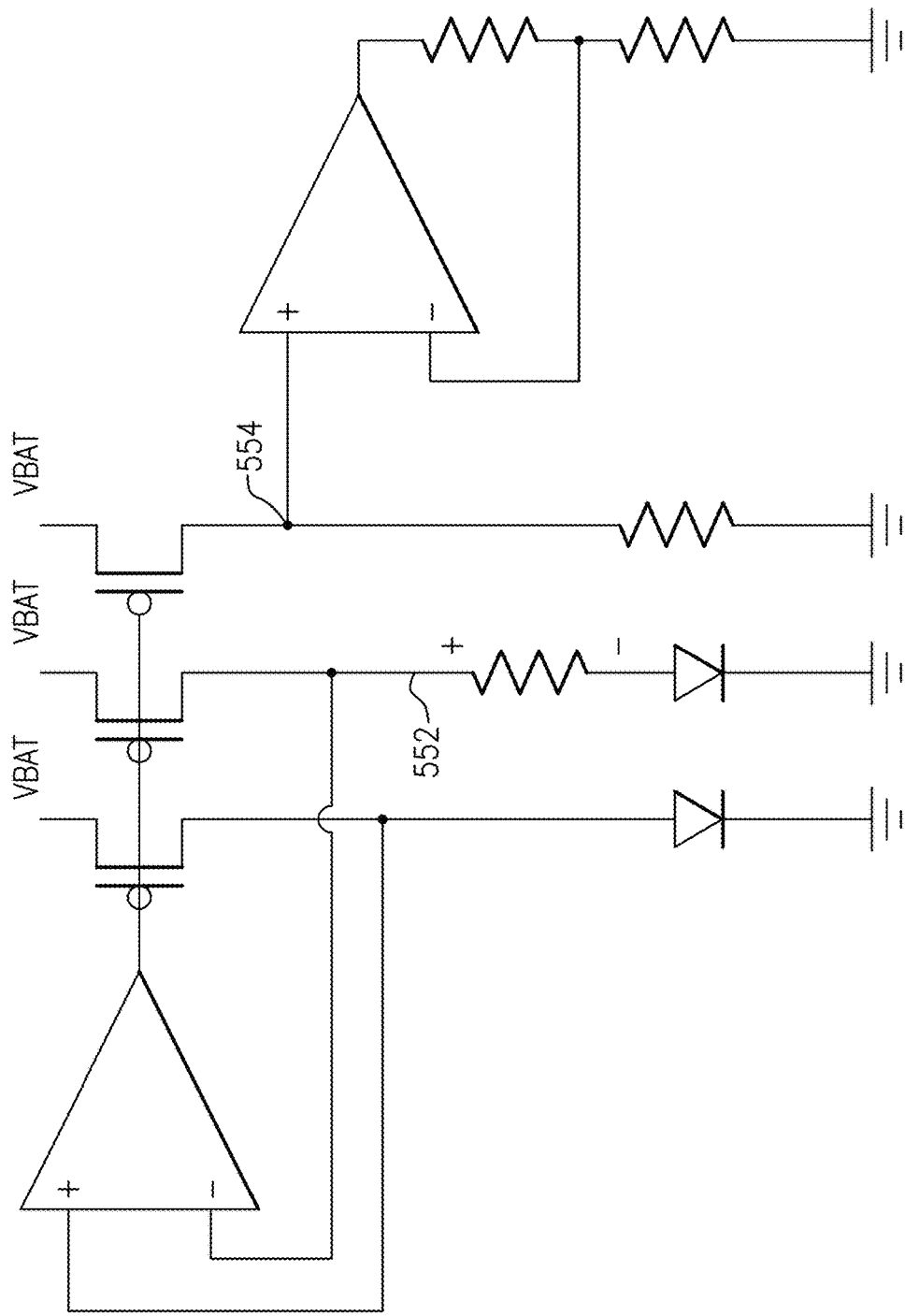

As previously described, the PTAT circuit 306 may be implemented using any type of PTAT circuit, including, for example, the PTAT circuits 500 and 550 illustrated in FIGS. 5A and 5B. Both of the PTAT circuits 500 and 550 use active matching to generate a VPTAT signal. As illustrated in FIG. 5A, the circuit 500 uses a current mirror to generate a PTAT signal that may be used for a temperature sensor circuit. A small, but clean (e.g., relatively noise free) PTAT signal may be generated at the node 502. Using an active current mirror circuit, a large (compared to the small signal generated at the node 502) replica PTAT signal may be generated from an FET current mirror at the node 504 in the circuit 500. In certain embodiments, the large replica PTAT signal may be larger than 150 mV while the small signal generated at the node 502 may be less than 50 mV.

As illustrated in FIG. 5B, the PTAT circuit 550 may use active differential transistor pairs to generate a PTAT signal that may be used for a temperature sensor circuit. A small, but clean (e.g., relatively noise free) PTAT signal may be generated at the node 552. Using active differential transistor pairs, a large (compared to the small signal generated at the node 552) replica PTAT signal may be generated at the node 554 in the circuit 550.

In both circuits 500 and 550, active elements, such as MOS or BJT transistors, may be used to generate the PTAT signal. It is often desirable for the PTAT signal to be relatively large to help reduce the negative effects of noise in the signal as the signal is transmitted to different elements of a wireless device. Circuit placement and layout may reduce the necessary size of the PTAT signal. However, because, for example, of layout and size constraints it is not always possible to place the PTAT circuit in an optimal location for all circuit elements that may use the PTAT signal. Another solution is to increase the current ratio used to generate the PTAT signal. However, increasing the current ratio can cause the size of the PTAT circuit to grow exponentially.

It is often desirable to test circuits, including temperature sensors, as part of the manufacturing process. Often, the circuits, such as the temperature sensors, are tested at a particular temperature, such as at room temperature. The temperature sensor offset can be measured and trimmed at room temperature. However, it is often desirable to determine one or more measurements at multiple temperatures. For example, to determine a slope of temperature sensor data, it is desirable to test the output of a temperature sensor at different temperatures. Performing tests of the temperature sensor at different temperatures can be challenging because, for example, it is necessary to adjust the temperature within a testing environment. Adjusting the temperature within a testing environment may require significant energy and resources, and can make the testing environment uncomfortable for testers. Alternatively, it is possible to adjust a temperature of a system under test by modifying a temperature of a test board using one or more heaters. However, it can be challenging to accurately control and change a temperature of the system under test by modifying a test of the test board because, for example, of heat dissipation between the test board and the system under test. For example, although a local temperature of a test board may be modified by, for example, 2° C., the change in temperature of the system under test may be some unknown value less than 2° C. Another alternative is to integrate a heater within the system under test itself. Embodiments disclosed herein integrate one or more heaters with the system under test, such as a temperature sensor. The heaters can then be controlled by a test board or other test system so as to control the testing process as desired by the manufacturer.

Figure 6:
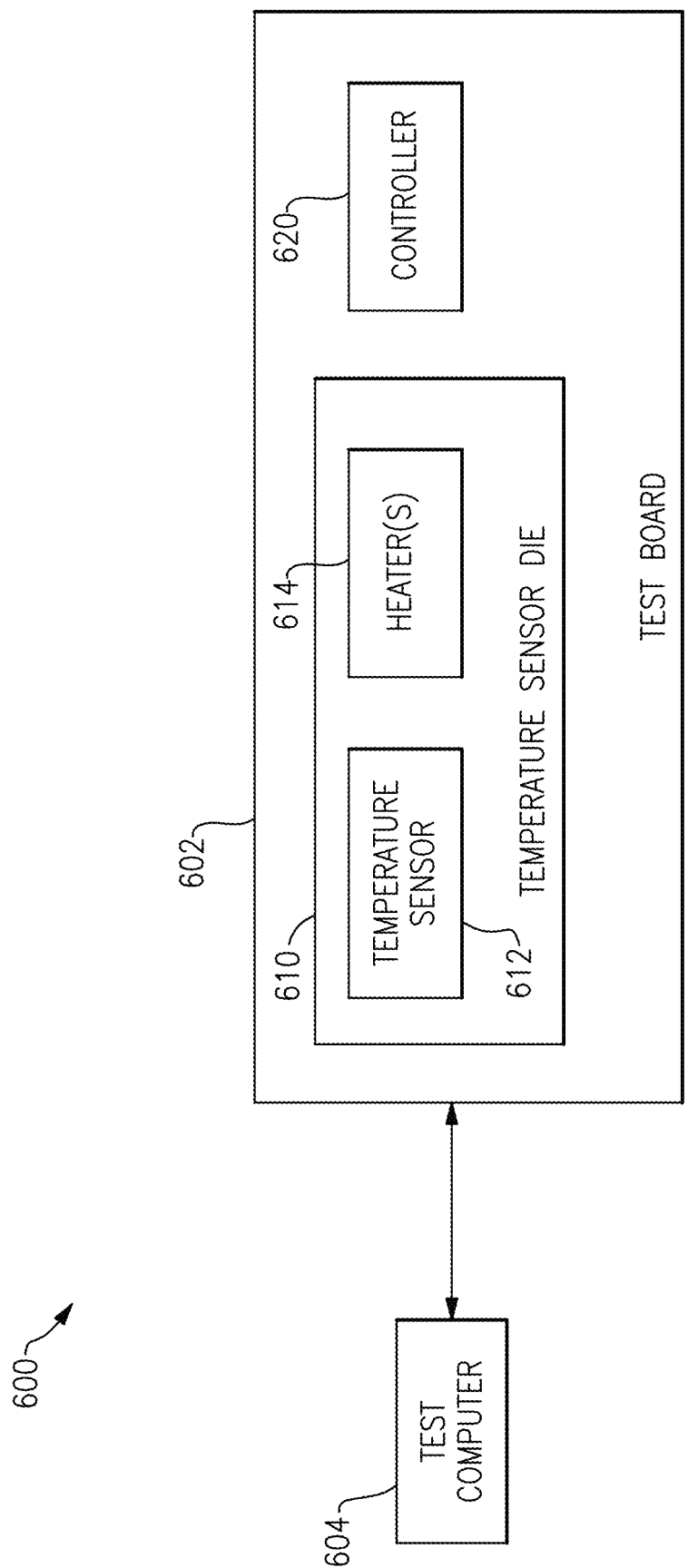
FIG. 6 illustrates a block diagram of an embodiment of a temperature sensor test system.

FIG. 6 illustrates a block diagram of an embodiment of a temperature sensor test system 600. The temperature sensor test system 600 may include a test board 602 for performing one or more tests of a system under test, such as for testing the temperature sensor die 610. It should be understood that the temperature sensor die 610 may be replaced with other temperature sensors to be tested or other circuits to be tested by the test board 602. Testing may be used to screen parts during manufacture of a device, such as a wireless device. Further, testing may be used for trimming, such as by use of an electronic fuse, or eFuse. Moreover, the testing may be used for calibrating the temperature sensor 612. In some cases, the temperature sensor 612 may itself be used to test one or more devices that include the temperature sensor 612 or temperature sensor die 610. For example, the front-end module 330 may be tested using the temperature sensor.

The temperature sensor die 610 may include a temperature sensor 612 to be tested and a set of one or more heaters 614. The one or more heaters 614 may be used to modify a temperature of the temperature sensor 612 so as to test the temperature sensor 612 at different temperatures. Advantageously, in certain embodiments, by integrating the heaters 614 onto the same die with the temperature sensor 612, the temperature of the temperature sensor 612 can be modified in a more fine-grained manner compared to modifying an ambient temperature or a temperature of a test board 602. Further, the amount of power to adjust the temperature of the system under test (e.g., the temperature sensor 612) can be reduced by placing the heaters closer to the system under test as is accomplished by integrating the heaters 614 with the temperature sensor 612.

The heaters 614 may include any type of heat generating circuitry. In certain embodiments, the heaters 614 may be formed from one or more resistors. Further, although the heaters 614 in the temperature sensor 612 are illustrated as separate non-overlapping boxes within FIG. 6, it should be understood that the heaters 614 may be integrated with the temperature sensor 612. Further, the heaters 614 may be dispersed between or around circuitry comprising the temperature sensor 612.

Further, the test board 602 may include a controller 620. The controller 620 may control a temperature of the temperature sensor 612 by providing a current to the heaters 614 corresponding to a desired temperature change. Moreover, the controller 620 may be configured to perform one or more test processes with respect to the temperature sensor die 610. These test processes may include testing the temperature sensor 612 at one or more different temperatures.

The temperature sensor test system 600 may further include a test computer 604. The test computer 604 may include a desktop or laptop computing system configured to implement or control one or more tests of the temperature sensor die 610 by interfacing with the test board 602. However, the test computer 604 is not limited to a general-purpose computing system and may include application-specific hardware for testing one or more devices under test as part of the manufacturing or assembly process.

Figure 7:
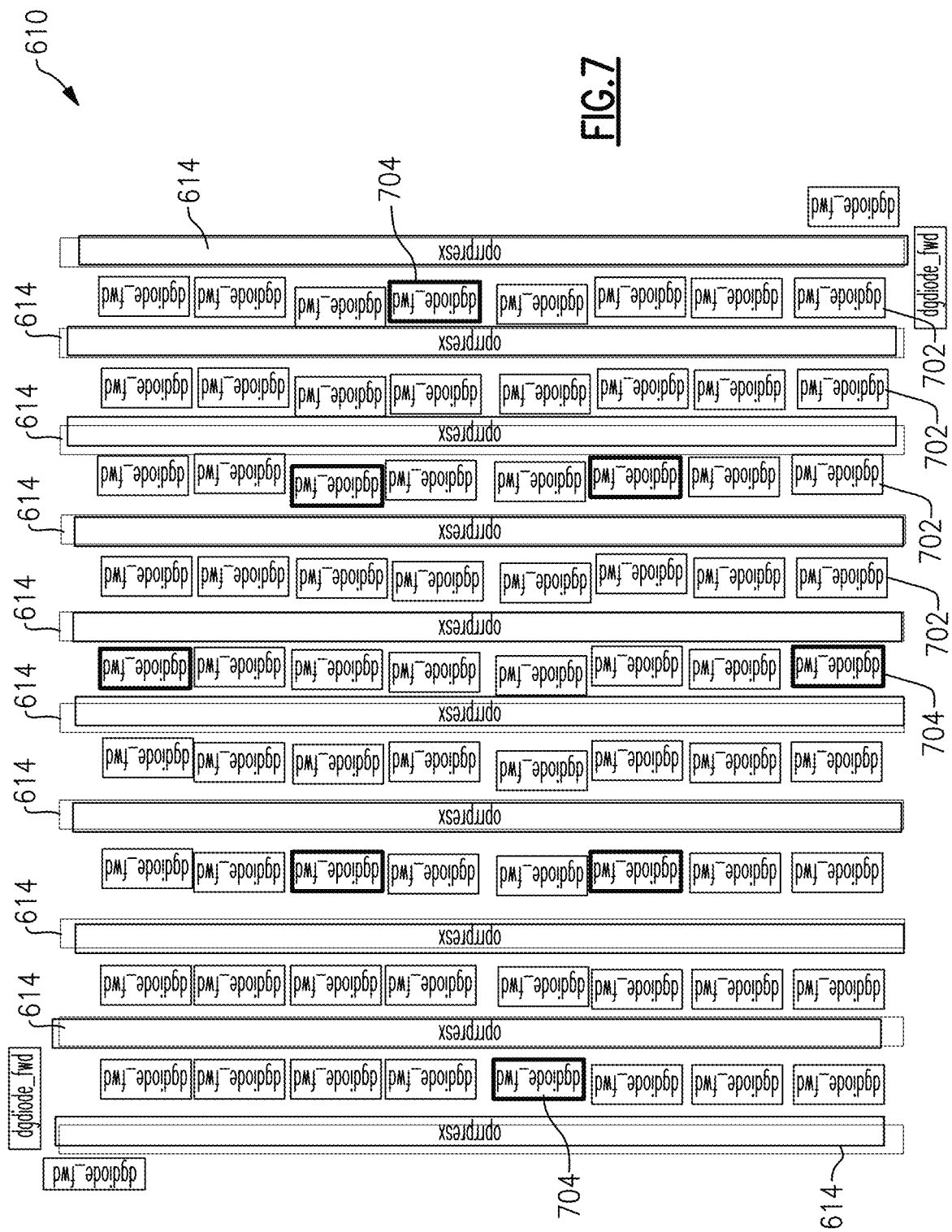
FIG. 7 illustrates an embodiment of a temperature sensor circuit under test.

FIG. 7 illustrates an embodiment of a temperature sensor circuit under test. The temperature sensor circuit may be implemented as a temperature sensor die 610. The temperature sensor die 610 may include a number of circuit elements corresponding to the PTAT circuit in the diode circuit used to generate a temperature sensor voltage, Vts. For example, each of the rectangles 702 and 704 represent the diodes that are included as part of an implementation of the PTAT circuit 500 or 550. The rectangles 702 form a diode network corresponding to one of the diodes within the PTAT circuit 500 or 550. Similarly, the rectangles 704 form a second diode network corresponding to the other diode within the PTAT circuit 500 or 550. For ease of illustration, only some of the diodes within FIG. 7 are marked with reference numbers. However, it should be understood that similarly colored or shaded rectangles, or rectangles with similar line width, within each column may be associated with the same diode circuit. Thus, the first and last columns each have seven diodes 702 associated with one diode circuit and one diode 704 associated with the other diode circuit included as part of the PTAT circuit 500 or 550. As illustrated in FIG. 7, one diode circuit may be formed from 64 diodes and the other diode circuit may be formed from 8 diodes. For example, in the PTAT circuits 500 and 550, the diode circuit on the right of the circuit that is in series with the resistor may be formed from 64 diodes and the diode circuit on the left may be formed from 8 diodes. In addition, the temperature sensor die 610 may include diodes 706 for forming the diode circuit that generates the Vdiode voltage, which is combined with the PTAT voltage to generate a temperature sensor output voltage, Vts.

So as to test the temperature sensor at different temperatures, one or more heaters 614 may be interspersed on the temperature sensor die 610 between the various circuit elements, such as the diodes, used to form the temperature sensor. These heaters 614 may be formed from one or more resistors that are formed on the temperature sensor die 610 along the sets of diodes 702 and 704. These resistor circuits 614 may form columns that are interspersed between columns of the diodes 702 and 704. The heaters 614 are, in certain embodiments, only used during the manufacturing process to test the temperature sensor die 610. Alternatively, in certain embodiments, the heaters 614 may be used for calibration or recalibration processes for calibrating or recalibrating the temperature sensor at some time after manufacture of the temperature sensor.

Example Temperature Testing Process

Figure 8:
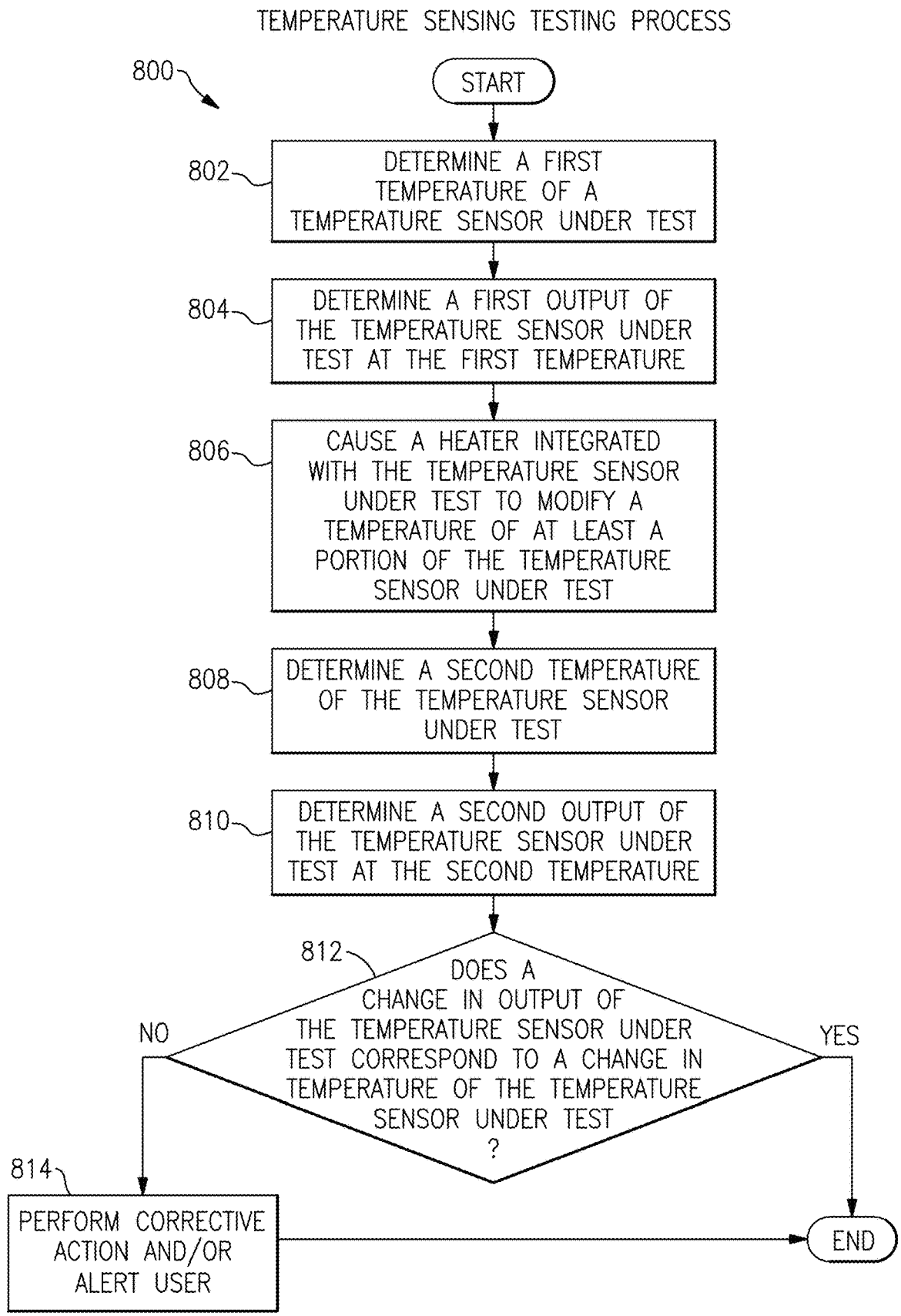
FIG. 8 presents a flowchart of an embodiment of a temperature testing process.

FIG. 8 presents a flowchart of an embodiment of a temperature testing process. It should be understood that the process 800 is one example of a temperature testing process for testing a device under test at different temperatures. Other processes for testing a device under test at different temperatures are possible. For example, operations of the process 800 may be performed in a different order or substantially in parallel. Thus, the order of the operations described with respect to the process 800 is for ease of description and not to limit the process 800. Moreover, it should be understood that a variety of systems, including a variety of hardware, software, firmware, or a combination thereof can implement at least portions of the process 800. For example, the process 800 may be performed, at least in part, by the test computer 604, the test board 602, the controller 620, where the heaters 614, or combinations of the same, and so forth. To simplify discussion and not to limit the present disclosure, the process 800 will be described with respect to particular systems.

The process 800 may begin at block 802 when, for example, the controller 620 determines a first temperature of a temperature sensor die 610 under test. In certain embodiments, it is the temperature sensor 612 itself that may be under test. However, as the one or more heaters 614 may be integrated with the temperature sensor 612, testing the temperature sensor 612 may include testing the temperature sensor die 610. The first temperature of the temperature sensor die 610 may be an ambient temperature of a testing environment or of the test board 602. In certain embodiments, the first temperature is a temperature of the temperature sensor die 610 when the heaters 614 are inactive, not in use, or not receiving a current. In certain embodiments, the controller 620 may determine a temperature using a temperature sensor other than the temperature sensor (not shown) on the test board 602 or integrated with the controller 620 that is separate from the temperature sensor die 610 under test.

At block 804, the controller 620 determines a first output of the temperature sensor under test at the first temperature. The first output may correspond to a voltage, Vts, output by the temperature sensor 612. The test board 602 may be configured to provide one or more output signals from the temperature sensor die to the controller 620. Thus, a temperature sensor output voltage, Vts, may be provided to the controller 620.

At block 806, the controller 620 causes a heater 614 integrated with the temperature sensor 612 under test to modify a temperature of at least a portion of the temperature sensor 612 under test. The controller 620 may cause the temperature of at least a portion of the temperature sensor 612 under test to be modified by applying a current to one or more heaters 614 integrated with the temperature sensor 612. As previously described, in certain embodiments, the heater 614 may comprise one or more resistors. The current applied to the resistors may cause the resistors to generate heat, which in turn alters the temperature of the temperature sensor 612. In certain embodiments, the test computer 604 may cause the controller 620 to apply the current to the heaters 614. In some cases, the test computer 604 may determine a desired temperature change for the temperature sensor 612 and may cause the controller 620 to provide a corresponding amount of current to the heater 614 to cause the desired temperature change.

At block 808, the controller 620 determines a second temperature of the temperature sensor 612 under test. The second temperature may differ from the first temperature because of the application of heat generated by the heaters 614 to the temperature sensor 612 at the block 806. In some embodiments, the second temperature may differ from an ambient temperature of the test environment and/or of the test board 602. In certain embodiments, the block 808 may include one or more of the embodiments described with respect to the block 802.

At block 810, the controller 620 determines a second output of the temperature sensor 612 under test at the second temperature. In certain embodiments, the block 810 may include one or more of the embodiments described with respect to the block 804.

At decision block 812, the controller 620 determines whether a change in output of the temperature sensor 612 under test corresponds to a change in temperature of the temperature sensor under test. In certain embodiments, the decision block 812 may include comparing a change in the output voltage, Vts, of the temperature sensor 612 to an expected change in the output voltage based on a change in the temperature of the temperature sensor 612 between the different readings of the temperature sensor output 612 at the blocks 804 and 810.

If it is determined at the decision block 812 that the change in the output of the temperature sensor 612 corresponds to a change in the temperature of the temperature sensor 612, the process 800 may end. Alternatively, the process 800 may be repeated with additional temperatures applied to the temperature sensor 612 or using other test conditions.

If it is determined at the decision block 812 that the change in the output of the temperature sensor 612 does not correspond to a change in the temperature of the temperature sensor 612, the controller 620 may perform corrective action and/or alert a user at the block 814. Corrective action may include trimming, or adjusting, one or more voltages generated by the temperature sensor 612 as part of the generation of the VATS value. For example, corrective action may include trimming the Vdiode or VPTAT voltage. Further, alerting a user may include modifying an indicator included on the test board 602, sending an alert to the test computer 604 for display to a user on a user interface, playing an audible sound, or any other alert process that can be used to inform a user that the temperature sensor 612 under test is not performing as expected or desired.

Figure 9:
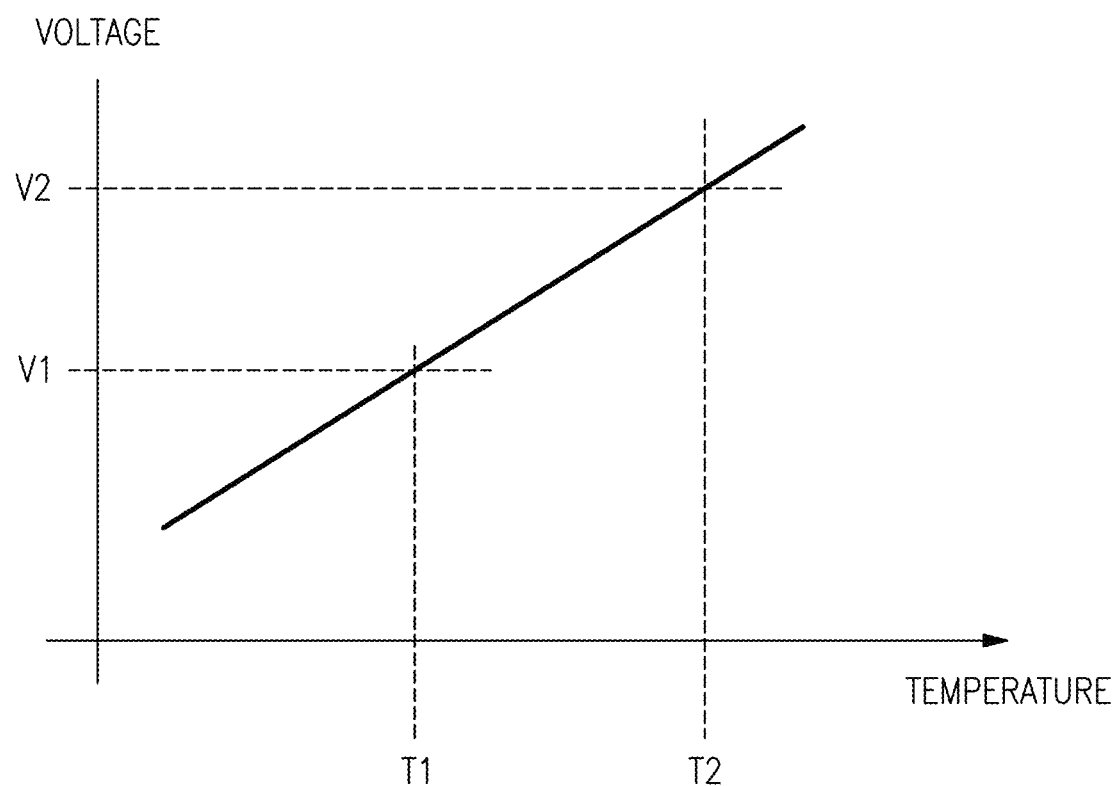
FIG. 9 illustrates one example of a temperature-voltage line in accordance with certain embodiments disclosed herein.

In some embodiments, a second temperature sensor voltage may be obtained by applying a known power to a built-in heater. For example, a known power value may be supplied to one of the heaters 614. By applying a known power to the heater 614, a slope of a temperature-voltage line may be obtained without heating the entire temperature sensor die 610 under test in a temperature chamber, ThermoChuck®, or the like. FIG. 9 illustrates one example of the temperature-voltage line that may be generated using embodiments of the process 800.

Test Data

Figure 10A:
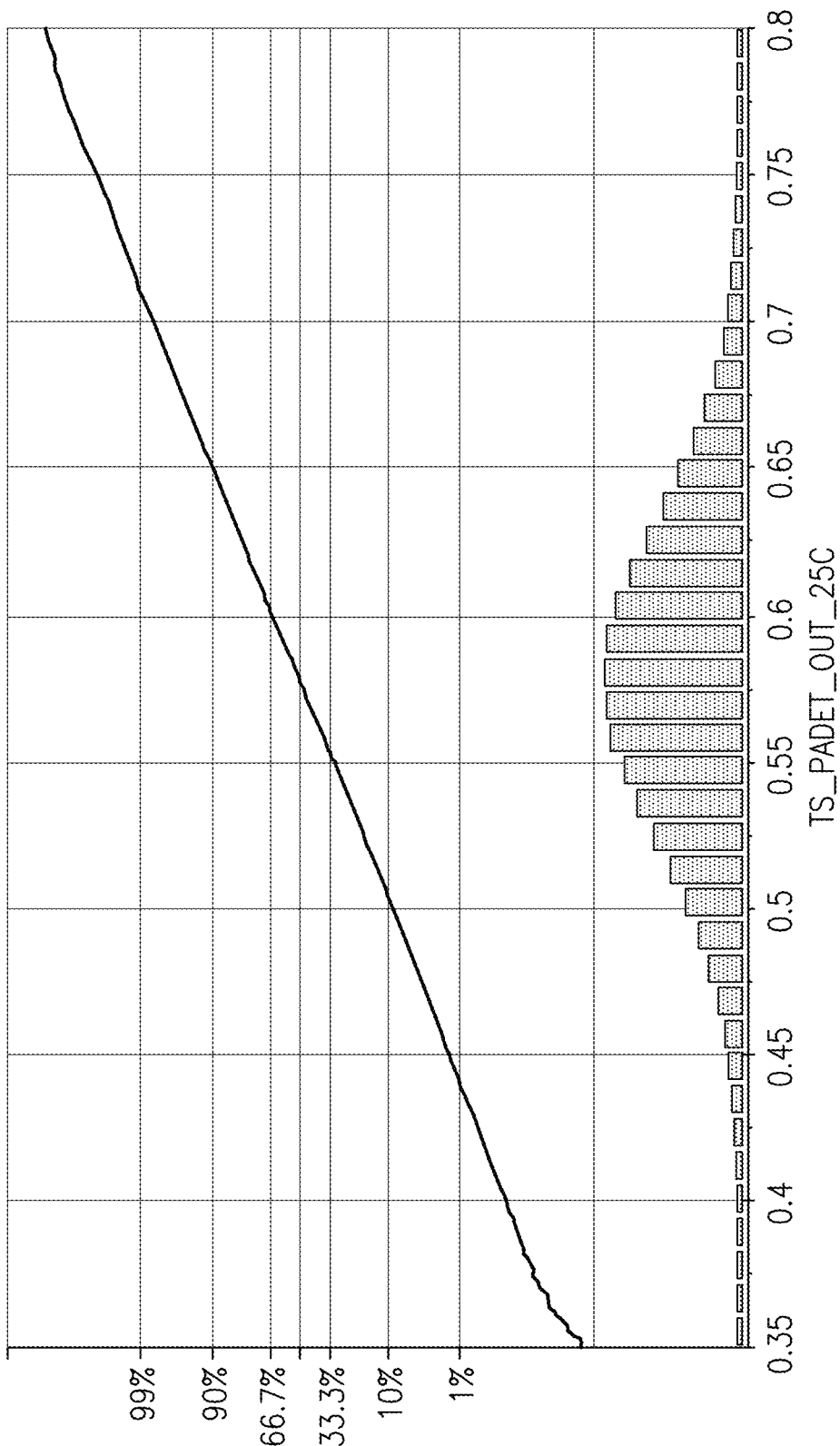
FIG. 10A illustrates test data for a temperature sensor implemented based on existing designs that do not use the embodiments disclosed herein.

A comparison of test data generated by testing of temperature sensors implementing previous designs and test data generated by testing of temperature sensors implementing embodiments disclosed herein (such as the temperature sensor circuits 200, 300) reveals that the temperature sensor circuit embodiments disclosed herein offer up to a 4x improvement over previous designs. FIG. 10A illustrates test data for a temperature sensor implemented based on existing designs that do not use the embodiments disclosed herein. FIG. 10B illustrates test data for a temperature sensor implemented using the embodiments disclosed herein.

The test data was collected for the temperature sensors tested at 25 degrees Celsius. Thus, the graphs illustrate temperature sensor measurements in an environment that is at 25° C. Each temperature may be associated with, or cause the temperature sensor to output a particular output voltage. Accordingly, in some implementations, the more consistent the sensing of temperature at a particular temperature, the more consistent the output voltage generated by the temperature sensor.

The histograms in each of FIGS. 10A and 10B represent the distribution of the output voltages when the temperature is at 25° C. The lines represent the cumulative density function (CDF) for the measurements. The CDF shows the percentages of temperature sensors that output particular voltage values. For example, FIG. 10A illustrates that 10% of temperature sensors produced using existing designs output a voltage lower than 0.5V at 25° C., and about a third of the temperature sensors produced using existing designs output a voltage higher than 0.6V at 25° C. In contrast, FIG. 10B illustrates that 100% of the temperature sensors output a voltage between 0.5V and 0.6V at 25° C.

The temperature sensor data illustrated FIG. 10A, which is obtained from a temperature sensor based on existing designs that do not implement the embodiments disclosed herein, has a sigma or standard deviation of approximately 60 mV. In contrast, the temperature sensor data illustrated in FIG. 10B, which is obtained from a temperature sensor implementing the embodiments disclosed herein, has a sigma or standard deviation of approximately 17 mV. Accordingly, the newer design disclosed herein has significantly less (e.g., over 3.5 times less) variation in the output of the temperature sensor.

Based on the above data obtained during testing, assuming a desired output voltage of between 0.5V and 0.6V when using a temperature sensor to measure a temperature of 25° C., the yield loss of temperature sensors under existing designs would be over 43% (10% below 0.5V+33.3% above 0.6V). However, the yield of temperature sensors implementing the embodiments disclosed herein would be almost 100%, or a yield loss of less than 1%. Advantageously, temperature sensors implementing the present disclosure leans to improved yield, and consequently, cost reduction and simplified logistical planning due. Alternatively, if parts are not screened for accuracy, then temperature sensors implementing the embodiments of the present disclosure will have significantly more accurate temperature measurements resulting in more consistent overheat prevention in products incorporating the temperature sensors, or better optimization of performance over temperature compared to products incorporating temperature sensors not implementing the embodiments of the present disclosure.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The term "coupled" is used to refer to the connection between two elements, the term refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the inventions are not intended to be exhaustive or to limit the inventions to the precise form disclosed above. While specific embodiments of, and examples for, the inventions are described above for illustrative purposes, various equivalent modifications are possible within the scope of the inventions, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the inventions provided herein can be applied to other systems, not necessarily the system described above. The elements and acts of the various embodiments described above can be combined to provide further embodiments.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A temperature sensor comprising:
   a voltage generator circuit including a diode circuit and a proportional to absolute temperature circuit, the diode circuit being configured to generate a diode voltage, and the proportional to absolute temperature circuit being configured to generate a proportional to absolute temperature voltage;
   a first scalar circuit configured to weigh the diode voltage to obtain a weighted diode voltage;
   a second scalar circuit configured to weigh the proportional to absolute temperature voltage to obtain a weighted proportional to absolute temperature voltage; and
   a combiner configured to combine the weighted diode voltage and the weighted proportional to absolute temperature voltage to obtain a temperature sensor voltage.

2. The temperature sensor of claim 1, wherein the combiner is implemented using an adder or an operational amplifier.

3. The temperature sensor of claim 1, wherein the first scalar circuit or the second scalar circuit is implemented using an operational amplifier.

4. The temperature sensor of claim 1, wherein the proportional to absolute temperature circuit is an active matching circuit that includes a current mirror circuit or a differential pair circuit.

5. The temperature sensor of claim 1, wherein the voltage generator circuit further includes a second combiner configured to combine the diode voltage and the proportional to absolute temperature voltage to obtain a bandgap voltage.

6. The temperature sensor of claim 5, further comprising a third scalar circuit configured to weigh the bandgap voltage.

7. A front-end module comprising:
   a power amplifier module configured to amplify a transmit signal; and
   a temperature sensor that includes a voltage generator circuit, a first scalar circuit, a second scalar circuit, and a combiner, the voltage generator circuit including a diode circuit and a proportional to absolute temperature circuit, the diode circuit being configured to generate a diode voltage, the proportional to absolute temperature circuit being configured to generate a proportional to absolute temperature voltage, the first scalar circuit being configured to weigh the diode voltage to obtain a weighted diode voltage, the second scalar circuit being configured to weigh the proportional to absolute temperature voltage to obtain a weighted proportional to absolute temperature voltage, the combiner being configured to combine the weighted diode voltage and the weighted proportional to absolute temperature voltage to obtain a temperature sensor voltage, and the temperature sensor being in electrical communication with the power amplifier module and configured to supply a bandgap voltage generated by the voltage generator circuit to the power amplifier module.

8. The front-end module of claim 7, wherein the combiner is implemented using an adder.

9. The front-end module of claim 7, wherein the combiner is implemented using an operational amplifier.

10. The front-end module of claim 7, wherein the first scalar circuit or the second scalar circuit is implemented using an operational amplifier.

11. The front-end module of claim 7, wherein the proportional to absolute temperature circuit is an active matching circuit that includes a current mirror circuit or a differential pair circuit.

12. The front-end module of claim 7, wherein the voltage generator circuit further includes a second combiner configured to combine the diode voltage and the proportional to absolute temperature voltage to obtain a bandgap voltage.

13. The front-end module of claim 12 wherein the temperature sensor further includes a third scalar circuit configured to weigh the bandgap voltage.

14. A wireless device comprising:
a front-end module including a power amplifier module configured to amplify a signal to obtain an amplified signal, and a temperature sensor that includes a voltage generator circuit, a first scalar circuit, a second scalar circuit, and a combiner, the voltage generator circuit including a diode circuit and a proportional to absolute temperature circuit, the diode circuit being configured to generate a diode voltage, the proportional to absolute temperature circuit being configured to generate a proportional to absolute temperature voltage, the first scalar circuit being configured to weigh the diode voltage to obtain a weighted diode voltage, the second scalar circuit being configured to weigh the proportional to absolute temperature voltage to obtain a weighted proportional to absolute temperature voltage, the combiner configured to combine the weighted diode voltage and the weighted proportional to absolute temperature voltage to obtain a temperature sensor voltage, the temperature sensor being in electrical communication with the power amplifier module and configured to supply a bandgap voltage generated by the voltage generator circuit to the power amplifier module; and
and an antenna in communication with the front-end module and configured to transmit the amplified signal.

15. The wireless device of claim 14, wherein the combiner is implemented using an adder.

16. The wireless device of claim 14, wherein the combiner is implemented using an operational amplifier.

17. The wireless device of claim 14, wherein the first scalar circuit or the second scalar circuit is implemented using an operational amplifier.

18. The wireless device of claim 14, wherein the proportional to absolute temperature circuit is an active matching circuit that includes a current mirror circuit or a differential pair circuit.

19. The wireless device of claim 14, wherein the voltage generator circuit further includes a second combiner configured to combine the diode voltage and the proportional to absolute temperature voltage to obtain a bandgap voltage.

20. The wireless device of claim 19, wherein the temperature sensor further includes a third scalar circuit configured to weigh the bandgap voltage.

* * * * *